Patented Aug. 23, 1938

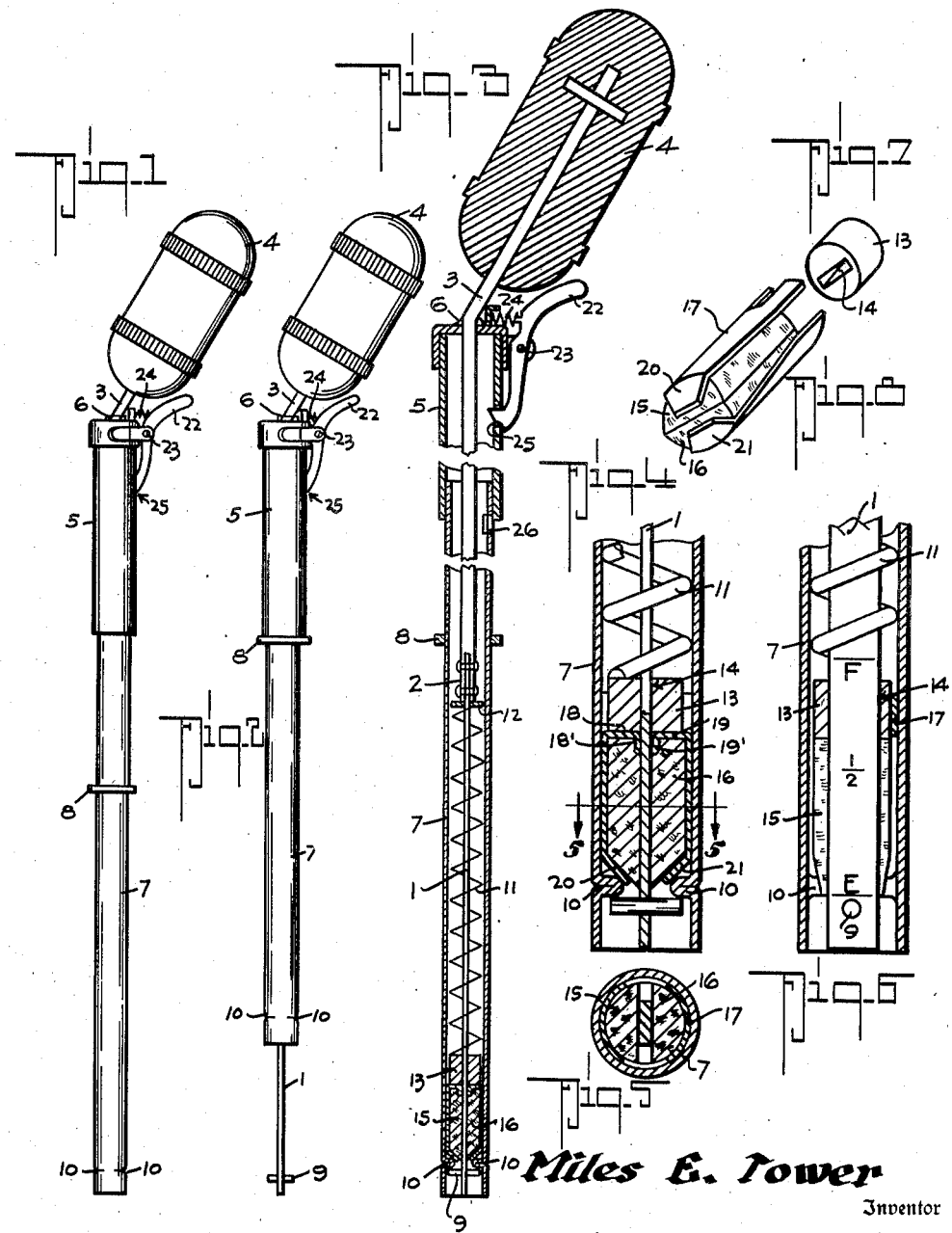

2,127,835

UNITED STATES PATENT OFFICE 2,127,835

GAUGE ROD

Miles E. Tower, Spokane, Wash.

Application March 8, 1938, Serial No. 194,598

6 Claims. (Cl. 33—126.7)

The present invention relates to an improved gauge rod or ullage stick for measuring the depth of fluent material in order to determine the quantity in a container. Specifically the gauge rod is designed for immersion in the oil in the crank case of an internal combustion engine to determine the depth of the oil by the extent of wetting of the rod. The primary object of the invention is the provision of a self-cleansing device of this character, and in carrying out my invention I provide means whereby the rod is cleansed or wiped immediately preceding its immersion in the oil, in order that the user of the rod may be assured it is in proper condition for use.

The rod is cleansed or wiped simultaneously with the projection of the rod for immersion in the oil, or in other liquid of a container, and in this manner the measuring of the oil is simplified; and the rod is also wiped automatically after the reading of the indications on the rod, thereby providing for a wiping operation both before and after the measuring of the oil.

The invention consists in certain novel combinations and arrangements of parts as will hereinafter be more fully set forth and claimed. In the accompanying drawing I have illustrated one complete example of the physical embodiment of my invention wherein the parts are combined and arranged according to one mode I have thus far devised for the practical application of the principles of my invention. It will be understood, however, that changes and alterations are contemplated and may be made in the exemplifying structures of the drawing, within the scope of my claims without departing from the principles of the invention.

Figure 1 is a view in side elevation of a gauge rod embodying my invention, showing the parts in position when the rod is not in use, and Figure 2 is a similar view, but with the parts in measuring position.

Figure 3 is an enlarged, detail, broken sectional view, showing the measuring rod retracted, as in Figure 1.

Figure 4 is a further enlargement, in section, showing the bottom portion of the device, with the rod retracted as in Figure 1.

Figure 5 is a transverse sectional view at line 5—5 of Figure 4.

Figure 6 is a sectional detail view in a plane at right angles to the plane of Figure 4, and showing the indications on the flat face of the rod.

Figure 7 is a perspective view of a bearing block for the rod, and Figure 8 is a perspective view of the holder for the wiper.

In carrying out my invention I employ a preferably flat metal rod or stick 1 with suitable indications thereon, as for instance E to indicate empty; F for full; and a ½ mark, to indicate the depth of the oil in a tank, or to indicate the depth of any other liquid in a container.

The rod is attached at 2 to a shank or stem 3, and a handle 4 is rigidly fixed to the stem, so that the rod, shank, and handle provide a rigid unit, with the handle slightly inclined from the vertical for convenience in manipulating the measuring device.

The shank is confined within an upper cylindrical housing 5, and the housing is welded or otherwise fixed to the shank as at 6.

A cylindrical tube 7 telescopes through the bottom of the housing, and this tube is provided with a fixed, exterior, annular collar 8 which forms a step for limiting the telescopic movement of the tube within the housing. The tube is of sufficient length to enclose the lower portion and lower end of the rod 1 and the latter is provided with a stop pin 9 that is transversely fixed at the lower end of the rod. Just above the lower open end of the tube 7 an integral, interior shoulder or a series of lugs 10 are fashioned for co-action with the stop pin 9 and as indicated in Figures 4 and 5 the pin, when retracted, fits up against these stop lugs 10 within the lower end of the tube.

For projecting the rod to measuring position I employ a spring 11 that is coiled about the rod, confined within the tube 7, and the upper end of this spring bears up against the underside of an upper stop washer 12 that is fixed and extends transversely through the upper end of the rod, just below the attachment 2 to the shank of the rod.

The lower end of the spring bears against a bearing block 13 which as shown best in Figure 7 is slotted to fit over the flat rod 1, and this block co-acts with the wiper that is located in the lower end of the tube 7. The wiper comprises two elongated pieces 15 and 16, fashioned of cork or other suitable material that fits snugly against the opposite sides of the flat rod 1, and these two wiping pieces or elements are mounted in a metal holder indicated as a whole by the numeral 17, and best illustrated in Figure 8. The holder 17 is a split cylinder having inturned flanges 18 and 19 extending transversely of the holder to support the block 13, and these inturned flanges at their adjoining ends are turned down to form lugs 18' and 19'. The lugs form friction or wear surfaces for contact with the opposite sides of the flat rod, and they guide the rod in its wiping movement longitudinally between the two cork pieces 15 and 16. At its lower end, the holder is fashioned with a pair of inturned or diagonally disposed retaining tongues 20 and 21, and the two cork pieces are tapered to fit snugly against these tongues. The two cork pieces 15 and 16 are thus retained by the integral flanges at the top and the integral tongues at the bottom of the holder, so that the rod may be reciprocated through the wiper and the cork pieces, by frictional contact with the opposite faces of the rod, wipe the rod for the removal of oil therefrom.

In measuring the quantity of oil in a tank, the handle 4 is grasped, the device as shown in Figure 1, is inserted in the filling opening of the tank, until the collar 8 of the tube 7 encounters a wall at the mouth of the opening. Then pressure is applied through handle 4, the handle and housing are depressed, causing the tube 7 to telescope within the housing. This telescopic movement compresses the spring 11 and at the same time projects the rod through the wiper, and the measuring end of the rod is exposed as in Figure 2, the lower end of the rod being immersed until the rod touches the bottom of the crank case or tank.

Before the rod is withdrawn for a reading, it is automatically latched in its projected position. For this purpose I employ a manually operated latch 22 that is pivoted at 23 at the upper end of the housing where it is readily accessible to the thumb or finger of the hand grasping the handle 4. A spring 24 mounted between the latch and the housing urges the working end of the latch into an aperture 25 of the housing 5, and in Figure 3 it will be seen that the tube 7, near its upper end, is also provided with an aperture 26 that is alined with the aperture 25 of the housing. As the housing is depressed and the tube telescopes therein, when the aperture 26 arrives at and registers with the aperture 25, the working end of the latch is automatically moved aside by contact from the wall of the aperture 26, and the spring 24 immediately engages the working end of the latch with both apertures 25 and 26, thus retaining the housing and tube in their telescoped position, and also retaining the spring 11 under tension, and the rod in projected position. After the rod is withdrawn from the filling hole of the crank case, the depth of oil therein may be read on the exposed faces of the rod.

After the reading has been made, the latch 22 is tripped, releasing the tube 7, and the latter, under tensions of the spring 11 is projected to position of Figure 1, and the wiper, actuated by the spring and carried by the tube, wipes the opposite faces of the rod. The outward movement of the telescopic tube is stopped by contact of the lugs 10 with the stop pin 9, and the wiped rod is again ready for use as before explained.

From the above description taken in connection with my drawing it will be apparent that I have provided a device that is simple in construction and operation, compact, efficient in the performance of its required functions, and a device that may be handled with facility.

Having thus fully described my invention, what I claim as new and desire to secure by Letters Patent is:—

1. The combination with a measuring rod, its rigid stem and handle, and a housing rigid with the stem, of a tube telescoping within said housing and enclosing the rod, and coacting means on the tube and rod for limiting outward movement of the tube, a wiping device mounted in the telescopic tube for co-action with the rod, a spring-device engaging the rod and the wiping device urging the tube to its outermost position, and means on the housing retaining the tube in telescoped position.

2. The combination with a measuring rod and a concentric rigid housing therefor, of a tube enclosing the rod and telescoping within the housing, co-acting means at the free ends of the rod and tube for limiting outward movement of the tube, a wiping device mounted in the tube for frictional engagement with the rod, a spaced retaining device mounted on the rod within the tube, a spring interposed between said retaining device and the wiping device, said spring urging the tube to its outermost position on the housing, and means for retaining the tube in telescoped position.

3. The combination with a measuring rod and a concentric rigid housing, of a tube telescoping within said housing and enclosing the rod, a pin in the rod and means rigid with the tube for limiting outward movement of the tube, a second spaced pin in the rod, a wiping device mounted in the tube for co-action with the rod, a compressible spring located between the second pin and the wiping device and urging the tube to its outermost position, and means for retaining the tube in telescoped position, whereby the lower free end of the rod is exposed in position for use.

4. The combination in a telescopic device with an enclosed measuring rod, of a wiper mounted in the telescoping member of the device for co-action with said rod, a tubular housing, means whereby said member is caused to telescope within said housing and thereby expose the free end of the rod, means for limiting the outward movement of said telescoping member, and a spring-device for actuating the wiper simultaneously with the outward movement of the telescoping member.

5. The combination in a telescoping device with an enclosed measuring rod, of a wiper mounted in the telescoping device for co-action with the rod, a tubular housing, means whereby said member is caused to telescope within said housing and thereby expose the free end of the rod, means for retaining said members in telescoped position, means for releasing said retaining means, a spring device for actuating the wiper simultaneously with the outward movement of the telescoping member, and means for limiting the outward movement of the telescoping member when released.

6. The combination in a telescoping device comprising two members, one telescoping within the other, a measuring rod enclosed thereby, of a holder mounted in the telescoping member of said device, a pair of wiping members mounted in said holder and embracing said rod and retaining means on the holder for said members, a spring coacting with the holder and acting to urge the telescoped member to extreme outward position, and co-acting means on the rod and said member for limiting the outward movement of said telescoping member.

MILES E. TOWER.